Nov. 21, 1961 A. LATOUR ET AL Re. 25,089

CIRCUIT-BREAKERS HAVING MAGNETIC BLOW-OUT

Original Filed July 16, 1956 2 Sheets-Sheet 1

INVENTORS,
André Latour
Yves Pelenc
Pierre Ramponneau

BY Glascock Downing & Seebold
Attorneys.

CIRCUIT-BREAKERS HAVING MAGNETIC BLOW-OUT

Original Filed July 16, 1956 2 Sheets-Sheet 2

INVENTORS,
André Latour
BY Yves Pelenc
Pierre Ramponneau
Glascock Downing & Seebold
Attorneys.

United States Patent Office

Re. 25,089
Reissued Nov. 21, 1961

25,089
CIRCUIT-BREAKERS HAVING MAGNETIC BLOW-OUT

André Latour, Grenoble, Yves Pelenc, St.-Martin-le-Vinoux, and Pierre Ramponneau, Grenoble, France, assignors to Etablissements Merlin & Gerin, Grenoble, France Original No. 2,875,305, dated Feb. 24, 1959, Ser. No. 598,126, July 16, 1956. Application for reissue June 23, 1960, Ser. No. 38,403
Claims priority, application France July 27, 1955
9 Claims. (Cl. 200—147)

Matter enclosed in heavy brackets [ ] appears in the original patent but forms no part of this reissue specification; matter printed in italics indicates the additions made by reissue.

This invention relates to circuit-breakers, and more particularly to circuit-breakers with magnetic-blow-out-arrangements which include arc extinction chambers built up of piles of refractory plates.

The several improvements which constitute the objects of the present invention may be applied separately to circuit-breakers, but are preferably applied in combination, in order to obtain on one hand circuit-breakers of a more aesthetic aspect and on the other hand presenting new technical advantages as will be disclosed hereinafter.

Heretofore the circuit-breakers were so constituted as to comprise as a whole the circuit-breaker proper, the control device, and the latching device, this latter term covering the device which after closing of the breaker keeps the breaker closed and at the same time the tripping (or opening) spring tensioned.

According to a first improvement the control device is separated from the circuit-breaker proper, so that they can be placed at some distance therefrom according to the local possibilities or necessities, and are connected with the circuit-breaker by a flexible cable for remote control, said cable being held under mechanical tension (pull) so long as the circuit-breaker is in closed position. In other words, the pull of the cable maintains the circuit-breaker closed and the tripping spring tensioned.

This solution presents various disadvantages. In the first place the use of the cable eliminates any mechanical reaction on the mounting means of the circuit breaker and the control device, the reaction to the force transmitted by the cable being absorbed by its own sheath, wherein it moves. As a consequence the frame which in the conventional circuit-breakers renders the same integral with its control device (and therefore has to be very rigid), may now be built lighter and less expensive.

On the other hand the circuit-breaker and the control device are rendered independent from each other, whereby the choice of the locations for mounting the circuit-breaker and the control device is considerably facilitated. Moreover a great mobility is conferred onto the control device, regardless of the position of the circuit-breaker (closed, open or in movement between these positions). As a consequence of this mobility, the control device may for instance be mounted directly on the door of a switching cubicle, thus providing a ready accessibility to the control device as well as to the circuit-breaker.

A further advantage of this disposition is that the control device is always accessible, regardless of whether the circuit-breaker is under tension or not, which of course is not the case with the designs hitherto used where the circuit-breaker had to be earthed before access could be had to the control. Thus inspection and maintenance of the two devices are greatly facilitated and simplified.

A further advantage of this solution is, on one hand, that the design of the circuit-breaker is simplified and that its shape can be rendered more aesthetic, and on the other hand, that quantity manufacture is facilitated, because one single type of the novel circuit-breaker may replace the various types necessary for the conventional circuit-breakers according to whether the control device is to be affixed in front, in the back, at the top or at the base of the circuit-breaker.

As a rule the arc-extinction chambers (called hereinafter chambers) of such circuit-breakers are supported by cantilever insulators fixed to a vertical frame. In order to reduce the bending stress exerted on the insulators it has always been attempted to distribute the weight of each chamber onto at least two insulators, which generally were the insulators bearing the incoming and outgoing terminals for the connection of the circuit-breakers to the system. Sometimes the chamber is borne by one of these insulators and a special third insulator so that each pole of the circuit-breaker comprises three insulators. Further insulators then formed the actuating rod of the movable contact assembly. Thus designed, the circuit-breakers presented a clumsy, aesthetically poor aspect, not to mention the additional problems of a mechanical and electrical nature raised by the presence of so many insulators intended to isolate the live parts or to transmit mechanical forces.

According to the invention a single cantilever insulator is used to carry the arc-extinction chamber, and in order to meet the increased stress exerted by the weight of the chamber an elliptical cross-section is given the insulator which advantageously will be an insulator moulded of a synthetic material and preferably of an epoxyd (ethoxylin) resin. Of course, any other material may be used having the same mechanical and electrical properties. Arc-extinction chambers built up by a plurality of ceramic (or refractory) cooling plates have a considerable weight, and therefore single supporting insulators have not been used up to now for the support of such chambers as the stresses in the conventional round insulators call for dimensions which render the circuit-breaker too cumbersome in width. The elliptical cross-section obviates this drawback.

*In order to further minimize the weight moment applied by the chamber to the supporting insulator, the generally rectangular profile of the chamber is cut off or beveled at its corners, giving the octagonal profile shown in the drawings.*

It is known that circuit-breakers must comply according to their nominal voltage with a given insulation level determined by surge voltage values. The length of the insulators varies according to whether they are tested with positive or negative impulse or surge waves. In order to obtain the optimal, i.e., the shortest insulator length, according to the invention electrodes are placed into the insulator body, are electrically connected to the top or base fixing studs so as to equalize the ionizing effect of the waves of the negative and positive polarity, so that the flash-over voltages of the insulators become almost equal for the two polarities. These electrodes are embedded in the body of the molded insulators. This of course would not be possible with ceramic insulators without creating other inconveniences.

Owing to the fact that the control devices are now removed from the circuit-breaker, it is possible to design the same in such a manner that the actuating rods take a position parallel to the upper or lower generatrix (or edge) of the corresponding insulators when the circuit-breaker is opened or closed, so that the later offers in both positions a particularly pleasing configuration.

As each arc-extinction chamber is supported by a single insulator, means are provided to secure its correct position with respect to the movable contact assembly, said means allowing the adjustment of the chamber in two planes perpendicular to each other.

Figure 1:
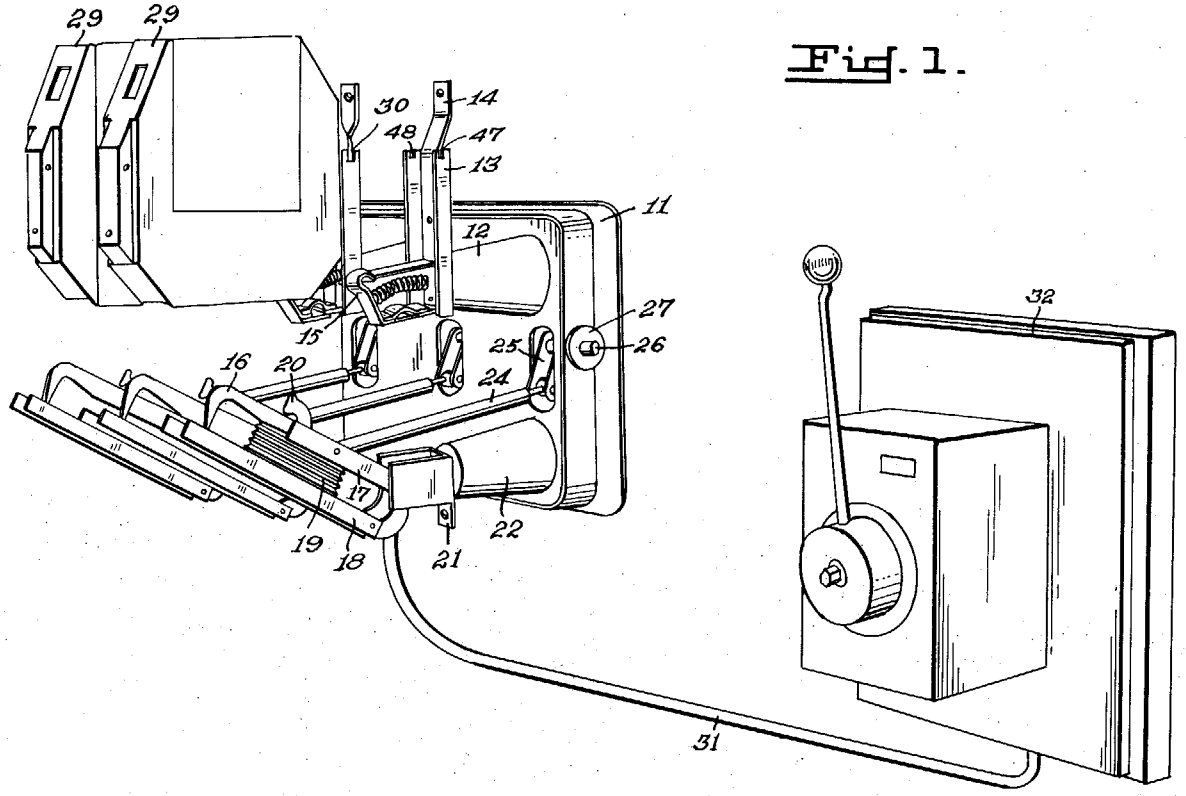
FIG. 1 is a schematic perspective view of the circuit-breaker according to the invention and of the remote control device placed at a distance with respect to the circuit-breaker.

FIG. 1 shows in perspective view a circuit-breaker with its control device placed at a distance. In order to facilitate the description the circuit-breaker is shown only with two arc-extinction chambers, the chamber of the third pole being removed. The circuit-breaker comprises a frame 11, housing the control shaft and bearing the three poles. Each pole is constituted by two supporting insulators 12 and 22, an arc-extinction chamber 29, the fixed contact 15 and the movable contact 16. Insulators 12 and 22 have an elliptical cross-section, the long diameter of the ellipse being vertical. Insulator 12 carries the fixed contact 15, the input terminal 14 and a positioning device 13 on which is suspended the arc-extinguishing chamber 29. The device 13, which will be described hereinafter, supports the chamber and can be adjusted so as to position the chamber correctly in order to allow an unimpeded movement of the movable contact 16. The latter is borne by an arm 17, whereon is fixed the auxiliary blade 18 which in a known manner replaces the conductor connecting the arc-extinction chamber to the output terminal. Between the arm 17 and the auxiliary blade 18 is fixed a bellows 19 which during the opening movement of the circuit-breaker directs by means of the nozzle 20 a jet of air onto the breaking arc. The assembly 16, 17, 18, 19, 20 is carried by the insulator 22 to which is also fixed the output terminal 21. The movable contact is actuated by means of a rod 24 and a crank 25 integral with the control shaft 26 placed in the interior of the frame 11. The shaft 26 turns in ball or roller bearings placed in flexible sleeves, of which one is shown at 27, and which by their flexibility allow a correct alignment of the shaft 26 and consequency of the cranks 25. In FIG. 1 only the right hand side sleeve 27 can be seen, the left one being hidden.

The shaft 26 is remotely actuated by the control mechanism 32 by means of a flexible cable such as the Bowden cable 31. The lever may control the cable 31 through the intermediary of a mechanism 32 which forms no part of this invention and which may be of any type, for example, the device described in the patent to Pelenc, No. 2,745,515, and assigned to the assignee of this application.

Figure 2:
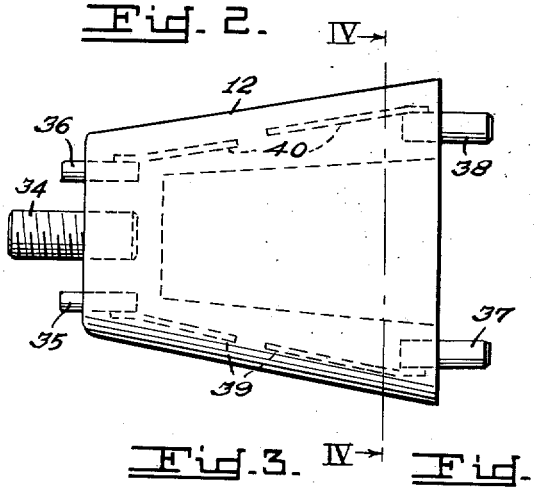
FIG. 2 is a side view of one insulator for the support of the arc-extinction chamber.
Figure 3:
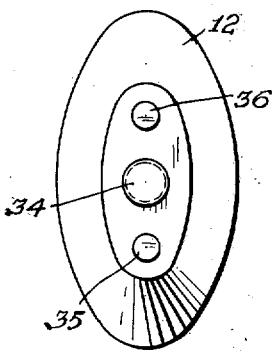
FIG. 3 is a top plan view of the insulator shown in FIG. 2.
Figure 4:
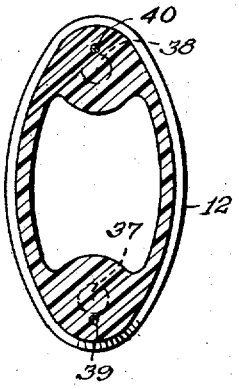
FIG. 4 is a cross-section of FIG. 2 seen in the direction of arrows IV, showing the cross section of the insulator by vertical planes perpendicular to the axis being an ellipse, the long axis of which is in a vertical plane.

FIG. 2 is a side view of one of the insulators which carry respectively the arc-extinction chamber and the movable contact assembly. FIG. 3 is a top plan view of the insulator shown in FIG. 2 and FIG. 4 is a cross-section along line IV—IV of FIG. 2. According to the invention these insulators have an elliptical [cross-section] *vertical section with its longer axis lying in the vertical plane perpendicular to the vertical section plane,* which, compared with insulators of circular [cross-section] *vertical section,* allows to reduce considerably their weight as well as their dimensions for a given bending force acting at their top in the direction of the long diameter of the ellipse. Though the manufacture of such oval insulators of a ceramic body is possible by a casting process, according to the invention the insulators will be manufactured of synthetic resins and preferably of epoxyd resins. The process of manufacture, contrariwise to that of ceramic insulators, allows one to embed directly in the body of the insulator the mounting bolt 34 for the structure bearing the arc-extinction chamber, the studs 35, 36 at the top of the insulator destined to prevent a rotation of said structure about the bolt 34, and the studs 37, 38 by which the insulator is bolted to the frame. Thus the insulator does not need the usual top and base cap. As a consequence the insulator may have the shortest length possible for a given insulation level (flash-over value), and the smallest cross-section for a given bending stress, owing to the minimum cantilever. Cost and overall dimensions are thus considerably reduced. Moreover it is possible to embed simultaneously the electrodes 39 and 40 which act favourably on the electrical field created around the insulator by impulse voltages and equalize the flash over values of positive and negative impulse waves allowing again to give the insulator the smallest length possible for a given impulse level.

*In speaking of the insulators as having an elliptical vertical section, with the long axis of the ellipse in the vertical plane, it will be understood that this can be accomplished in different ways; e.g., by using an insulator whose actual cross-section is an ellipse, with the long axis in a vertical plane perpendicular to the vertical section plane, or by using an insulator whose actual cross-section may not be elliptical, but whose longitudinal insulator axis is so inclined to the horizontal as to yield the specified elliptical vertical section.*

Figure 5:
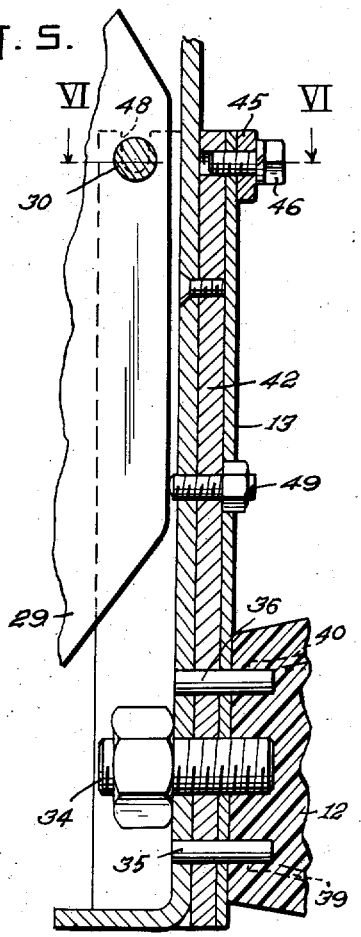
FIG. 5 is an elevational cross-section of the device for the mounting of the arc-extinction chamber shown fixed to the supporting insulator.
Figure 6:
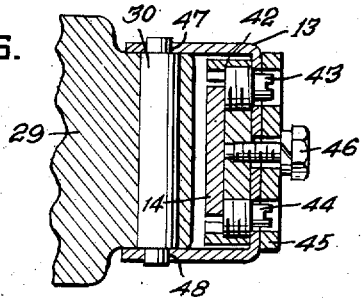
FIG. 6 is a horizontal section taken along line VI—VI of FIG. 5.

FIGS. 5 and 6 show an elevational and a plan cross-section of the positioning device permitting the adjustment of position of the arc-extinction chamber in a vertical and a horizontal plane. This adjustment is indispensable in order to allow on one hand the unimpeded movement of the arm 17 carrying the movable contact within the chamber 29, and on the other hand to give to the auxiliary contacts the form of pincers which in a known manner are disposed in the arc-extinction chamber in the correct position allowing them to retain for the necessary time the auxiliary blade 18. This device has been described in the [pending] application of Latour, Ser. No. 565,248, *now Latour Patent 2,815,418 issued December 3, 1957.*

The positioning and supporting device includes a channel iron 13 fixed to the insulator 12 by the bolt 34 and kept in vertical position by the studs 35 and 36. Within the channel 13 is placed over its whole length a channel 42 of much heavier cross-section than that of channel 13. Within channel 42 is placed the flat piece 14 constituting the input terminal. At the upper end, channel 42 has two threaded holes (see FIG. 6) wherein are screwed the screws 43 and 44. The heads of these screws are of a smaller diameter than the screws themselves and pass through two holes in the channel 13 and in the cross-piece 45 so that they are accessible from the exterior. The screws 43 and 44 are flush with the rear (right) side of channel 42 (FIG. 6) and bear with their large diameter on the inside of channel 13. Also at its upper end and in its median plane the channel 42 has a threaded hole wherein is screwed the screw 46 which passes through a hole in channel 13 and whose head bears on the aforesaid cross-piece 45 and presses together the upper ends of channels 13 and 42. Further down an adjusting screw 49 is screwed into the channel 42. This screw passes freely through holes in channel 13 and terminal 14. Finally the legs of channel 13 are provided at their upper end with notches, 47 and 48, in which are placed the ends of axle 30 integral with the chamber 29.

Figure 7:
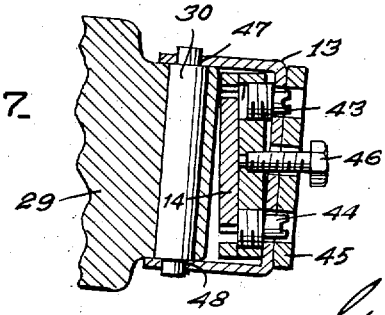
FIG. 7 is a view similar to FIG. 6 showing the positioning device of FIG. 5 adjusted so as to direct the vertical median plane of the chamber towards the left hand side when seen by standing in front of the chamber.

The positioning of the chamber 29 in the vertical plane is obtained by means of the screw 49. If the lower part of the chamber is to be lifted the screw 49 must be screwed further into its hole in channel 42. The adjustment of the chamber 29 in a horizontal plane is achieved by means of the screws 43 and 44. So for instance, seen from a position in front of the chamber the same is to be displaced towards the left, first the screw 46 and then the screw 43 are unscrewed. The screw 43 then begins to come out of the channel 42 and to press against the channel 13. As the channel 42 due to its large cross-section is considerably more rigid than channel 13, the latter yields to the pressure exerted by the screw 43 and is deformed, as shown in FIG. 7. As a consequence the imaginary common axis of the notches 47 and 48 is deviated and so is the axle 30, whereby the chamber 29 is slightly turned toward the left. When the chamber 29 has been adjusted in its correct position the screw 46 is again tightened and all the pieces are thus blocked in their new position.

It will be appreciated that the improvements described hereabove not only secure to the breaker a highly efficient and aesthetic shape, but provide a very economical design affording the possibility of a most easy installation and a remarkable accessibility of all parts for purposes of inspection and maintenance.

What is claimed is:

[1. A multi-pole circuit breaker comprising an arc chute for each pole, and a single cantilever insulator supporting each respective chute, the axis of each insulator disposed in a vertical plane, the cross section of at least one insulator by a vertical plane, normal to the first named vertical plane, being an ellipse, the long axis of which is vertical, and a movable contact assembly for each pole.]

2. The circuit breaker as set forth in claim [1] *9* including an actuating rod connected at one end to each contact, a control shaft connected to the other end of said rod, the said rod being in a position parallel to the edge of said insulator in the open and closed position of the circuit [interrupter] *breaker*.

3. A circuit-breaker according to claim [1] *9*, characterized in that the insulators carrying the arc-extinction chambers and the movable contact assemblies are [made] *molded* of synthetic resins and fixed to a vertical frame, and that the means for fixing the insulators to the frame and the means for fixing the chamber, and contact assemblies to the insulator are [embedded in] *integrally molded within* the body of synthetic resins of the insulators.

4. A circuit-breaker comprising a first unit having fixed and movable sets of contact elements, individual standoff insulators for said elements, a base carrying said insulators, a common control shaft connected to all of said movable contact elements for conjoint motion thereof to open and closed conditions, a second unit physically separate from the first unit and comprising a control lever, and a flexible motion-transmitting connection between said control lever and said control shaft.

5. In an electrical circuit-breaker of the magnetic blowout type, a first support on which are mounted movable contact blades forming the poles of the breaker and cooperating with contact elements to open and close the circuit upon movement of said blades, and common control means for controlling the position of the blades; a second support, structurally independent of said first support, including an operable control lever; and flexible motion-transmitting connections extending from the control lover on the second support to the control means on the first support, whereby the position of the current-carrying parts can be controlled from the lever regardless of the relative mounting positions of the two supports.

6. A multi-pole circuit interrupter comprising a frame, a plurality of pairs of contacts, an arc extinction chamber for each contact pair, a pair of cantilever insulators for each respective contact pair secured to said frame, one insulator of each pair arranged to support the arc extinction chamber and its associated fixed contact, the other insulator of each pair arranged to support the respective movable contact, the said insulators being elliptical in cross section and disposed with the long axis of the ellipse in a vertical plane, and means spaced from the said frame for controlling the position of the movable contact of each contact pair.

7. The invention as set forth in claim 6, including a crank and rod assembly connected at one end to each respective movable contact and at the other end to a control shaft to gang the contacts for motion together, the said rod being in a position parallel to the edge of the insulator in open and closed positions of the circuit interrupter.

[8. The invention as set forth in claim 1, wherein the insulator has a longitudinal axis, the cross section by planes perpendicular to said axis being an ellipse, the long axis of which is in a vertical plane.]

*9. A multi-pole circuit breaker comprising an arc chute for each pole and a single cantilever insulator supporting each respective chute, the axis of each insulator being disposed in a vertical plane, the section of the said insulators by a plane perpendicular to said axis being elliptical, the long axis of the ellipse being in said vertical plane, and a movable contact assembly for each pole.*

*10. A multi-pole circuit breaker comprising an arc chute for each pole and a single cantilever insulator supporting each respective chute, the axis of each insulator being disposed horizontally in a vertical plane, the cross-section of said insulators being an ellipse, the long axis whereof is in said vertical plane, and a movable contact assembly for each pole.*

*11. A circuit breaker according to claim 9, in which each arc chute is of octagonal profile.*

References Cited in the file of this patent or the original patent

UNITED STATES PATENTS

| | | |
|---|---|---|
| 541,332 | Patterson | June 18, 1895 |
| 590,806 | Locke | Sept. 28, 1897 |
| 668,300 | Waite | Feb. 19, 1901 |
| 1,736,043 | Kyle | Nov. 19, 1929 |
| 2,067,648 | Reher | Jan. 12, 1937 |
| 2,069,171 | Merkel | Jan. 26, 1937 |
| 2,430,008 | Fernier | Nov. 4, 1947 |
| 2,515,596 | Griffes | July 18, 1950 |
| 2,520,258 | Pittman et al. | Aug. 29, 1950 |
| 2,614,197 | Lightfoot | Oct. 14, 1952 |
| 2,734,971 | Lingal et al. | Feb. 14, 1956 |
| 2,745,515 | Pelenc | May 15, 1956 |

FOREIGN PATENTS

| | | |
|---|---|---|
| 782,183 | France | Mar. 11, 1935 |
| 625,177 | Germany | Feb. 5, 1936 |
| 696,993 | Germany | Oct. 3, 1940 |
| 1,106,111 | France | July 13, 1955 |